(12) United States Patent
Lee et al.

(10) Patent No.: US 7,852,040 B2
(45) Date of Patent: Dec. 14, 2010

(54) MOTOR DRIVER SYSTEM AND METHOD FOR CONTROLLING MOTOR DRIVER

(75) Inventors: Kyung Hoon Lee, Seoul (KR); June Hee Won, Seoul (KR); Gil Su Lee, Seoul (KR); Jun Ho Ahn, Seoul (KR); Jae Yoon Oh, Seoul (KR)

(73) Assignee: LG Electronics Inc., Seoul (KR)

( * ) Notice: Subject to any disclaimer, the term of this patent is extended or adjusted under 35 U.S.C. 154(b) by 482 days.

(21) Appl. No.: 11/941,736

(22) Filed: Nov. 16, 2007

(65) Prior Publication Data
US 2008/0297097 A1 Dec. 4, 2008

(30) Foreign Application Priority Data
May 30, 2007 (KR) .................. 10-2007-0052796

(51) Int. Cl.
*H02P 27/04* (2006.01)
(52) U.S. Cl. .................. 318/801; 318/701; 318/716; 318/719; 318/432
(58) Field of Classification Search .......... 318/701, 318/712, 715, 716, 719, 801, 432, 434, 538, 318/539
See application file for complete search history.

(56) References Cited

U.S. PATENT DOCUMENTS

| | | | |
|---|---|---|---|
| 6,407,531 B1 * | 6/2002 | Walters et al. | 318/805 |
| 6,429,620 B2 * | 8/2002 | Nakazawa | 318/701 |
| 6,724,168 B2 | 4/2004 | Cheong et al. | |
| 6,763,622 B2 * | 7/2004 | Schulz et al. | 318/700 |
| 7,015,667 B2 * | 3/2006 | Patel et al. | 318/432 |
| 7,023,168 B1 * | 4/2006 | Patel et al. | 318/757 |
| 2004/0070362 A1 * | 4/2004 | Patel et al. | 318/701 |

OTHER PUBLICATIONS

Capecchi, et al. "Position Sensorless Control of Transverse-Laminated Synchronous Reluctance Motors" pp. 1766-1773 (2000).

* cited by examiner

*Primary Examiner*—Walter Benson
*Assistant Examiner*—Thai Dinh
(74) *Attorney, Agent, or Firm*—Birch, Stewart, Kolasch & Birch, LLP

(57) ABSTRACT

A motor driver system and its control methods are discussed. Even when a command magnetic flux decreases as a motor operates in a field weakening region, a current angle can be maintained always below a limit value, thereby obtaining the stability of the motor control.

12 Claims, 5 Drawing Sheets

MOTOR DRIVER SYSTEM AND METHOD FOR CONTROLLING MOTOR DRIVER

This application claims the priority benefit of Korean Patent Application No. 10-2007-0052796, filed on May 30, 2007, which is hereby incorporated by reference for all purposes as if fully set forth herein.

BACKGROUND OF THE INVENTION

1. Field of the Invention

The present invention relates to a motor driver system and its control method, which are capable of controlling a current angle of a motor such that the current angle does not increase more than necessary when the motor operates in a field weakening region.

2. Description of the Related Art

A synchronous reluctance motor has a simple construction and is economical compared with general induction motors and synchronous motor driving systems. In addition, a converter that applies electric power to the synchronous reluctance motor uses a small power device, so the synchronous reluctance motor is more economical and has high reliability.

When the synchronous reluctance motor operates in a field weakening region, a motor driving voltage is not sufficient, so the current applied to the motor is generally increased to maintain a static torque. In this case, however, the current angle of a command current applied to the motor is increased freely without set limits. As a result, the current angle of the command current applied to the motor is increased by more than necessary, causing a problem that ripples are generated in the command current and/or the motor controlling becomes unstable.

SUMMARY OF THE INVENTION

The present invention has been made in view of the above-mentioned problem and other limitations associated with the related art.

It is an object of the invention to stably control a motor by preventing a current angle of a command current from being increased by more than necessary, especially when the motor operates in a field weakening region.

Another object of the present invention is to provide a motor and a method of controlling the motor to improve the motor performance.

Another object of the present invention is to provide a motor, motor driving system and method which address the limitations and disadvantages associated with the related art.

One exemplary embodiment of the present invention provides a motor driver system including: an inverter that applies a motor driving 3 phase voltage to a motor; and an inverter driver that generates and outputs a command voltage to the inverter to make the speed of the motor follow a command velocity, wherein when the motor operates in a field weakening region, the inverter driver controls a magnetic flux command value to prevent a command current angle of a d-axis (direct axis) or q-axis (quadrature axis) command current from exceeding a pre-set range.

Another exemplary embodiment of the present invention provides a motor driver system including: an inverter that applies a motor driving 3 phase voltage to a motor; and an inverter driver that generates and outputs a command voltage to the inverter to make the speed of the motor follow a command velocity, and reduces a magnetic flux command value of the motor when the motor operates in a field weakening region; and a command velocity controller that reduces the command velocity when a q-axis command current value generated according to the command velocity to generate the command voltage in the inverter driver is higher than a pre-set upper limit value.

Still another exemplary embodiment of the present invention provides a motor driver system including: an inverter that applies a motor driving 3-phase voltage to a motor; an inverter driver that generates and outputs a command voltage to the inverter to make the speed of the motor follow a command velocity, and reduces a magnetic flux command value of the motor when the motor operates in a field weakening region; and a command velocity controller that reduces the command velocity of the motor when the magnetic flux command value becomes lower than a pre-set lower limit value.

Yet another exemplary embodiment of the present invention provides a method for controlling a motor driver system including: generating a q-axis command voltage to make the speed of a motor follow a command velocity; controlling a magnetic flux command value of the motor so as to prevent a command current angle of a d-axis or q-axis command current from exceeding a pre-set range when the motor operates in a field weakening range; and generating a d-axis command voltage according to the controlled magnetic flux command value.

Another exemplary embodiment of the present invention provides a method for controlling a motor driver system including: generating a q-axis command voltage to make the speed of a motor follow a command velocity; reducing a magnetic flux command value of the motor when the motor operates in a field weakening region; and reducing the command velocity when a q-axis command current value generated according to the command velocity to generate the q-axis command voltage is higher than a pre-set upper limit value or the magnetic flux command value becomes lower than a pre-set lower limit value.

According to one aspect, the present invention provides a driving device for controlling an inverter of a motor, comprising: an inverter driver configured to generate and output a command voltage to the inverter of the motor to make the speed of the motor follow a command velocity, and to set an upper limit value for a current angle of the motor, wherein the current angle of the motor is based on a d-axis current and a q-axis current of the motor, and wherein the inverter driver varies a d-axis command voltage of the motor such that the current angle of the motor does not to exceed the set upper limit value when the motor operates in a field weakening region.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Hereinafter, a cogeneration system according to the exemplary embodiments of the present invention will be described with reference to the accompanying drawings.

Figure 1:
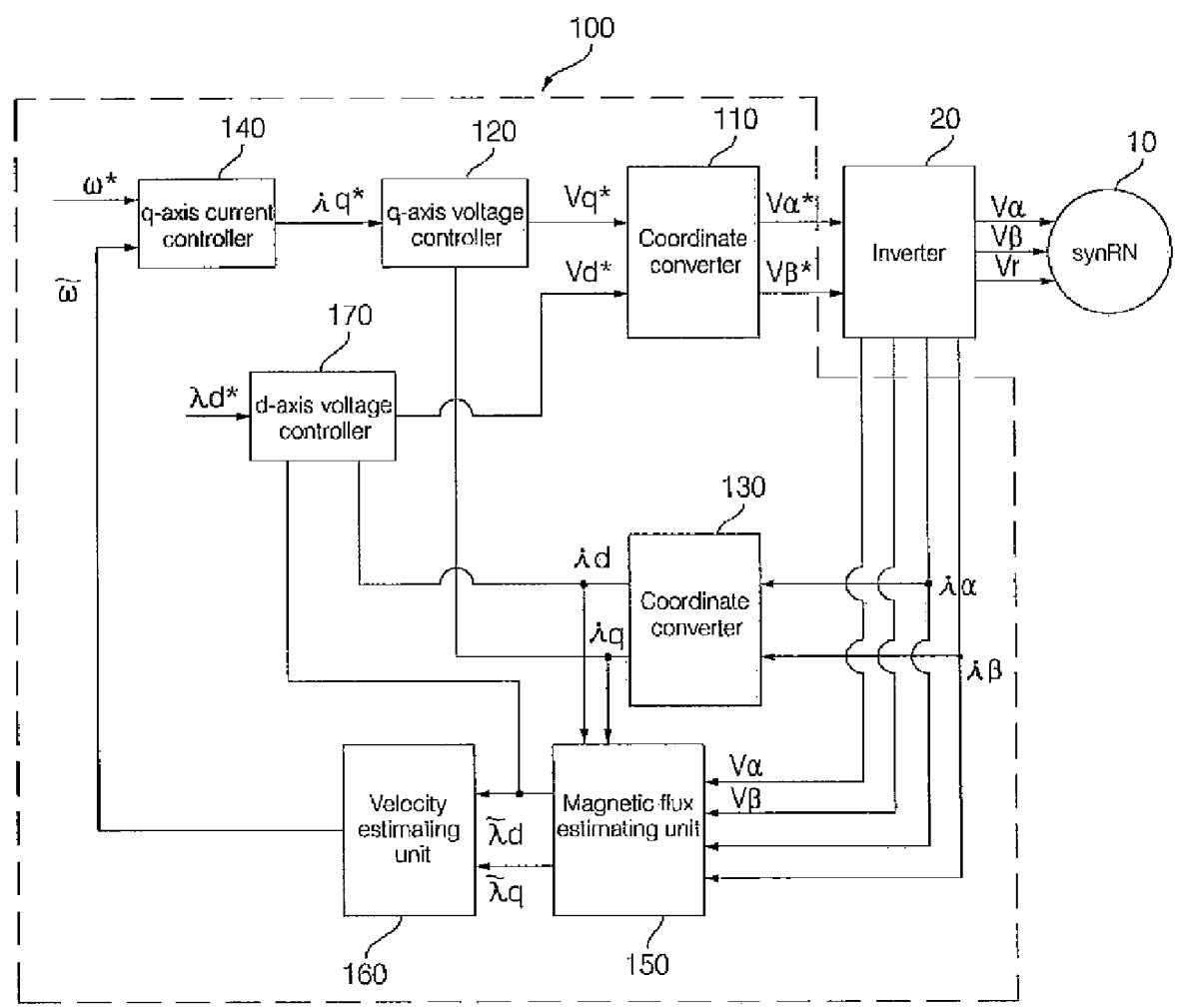
FIG. 1 is a schematic block diagram of a synchronous reluctance motor driver system according to an embodiment of the present invention.

FIG. 1 is a schematic block diagram of a synchronous reluctance motor driver system according to the present invention. The synchronous reluctance motor driver system includes a motor 10, an inverter 20, and an inverter driver 100. The system may include other components, and all the components of the system are operatively coupled and/or configured.

The inverter 20 applies 3-phase voltages $V_\alpha$, $V_\beta$, and $V_\gamma$ as a driving voltage, to the synchronous reluctance motor 10. Generally, the synchronous reluctance motor 10 has a plurality of poles and teeth with respect to a stator and a rotor. In general, there are windings on the stator, while there is no winding or a magnet on the rotor. The magnetic poles of the stator are connected in series to form an independent phase of the multi-phase synchronous reluctance motor. When each winding applies currents in turn, torque is generated, and accordingly, magnetic force is formed between the magnetic poles of the adjacent rotor and the stator.

The inverter driver 100 outputs command voltages $V_d^*$ and $V_q^*$ to the inverter 20 to make the speed $\tilde{\omega}$ of the synchronous reluctance motor 10 follow a command velocity $\omega^*$. In the present exemplary embodiment, the command voltages preferably mean d-axis and q-axis voltages $V_d^*$ and $V_q^*$ in a rotating coordinate system, but actually, the inverter driver 100 outputs the command voltages $V_\alpha^*$ and $V_\beta^*$ with coordinates, which have been converted by a coordinate converter 110, to the inverter 20. Here, the coordinate conversion is a general procedure that is performed to drive the inverter 20. The coordinate conversion is carried out according to a general method, so its description will be omitted. The command voltages $V_\alpha^*$ and $V_\beta^*$ actually applied to the inverter 20 are determined according to the command voltages, namely, the d-axis and q-axis voltages $V_d^*$ and $V_q^*$, in the rotating coordinate system.

Among the command voltages $V_d^*$ and $V_q^*$, the q-axis command voltage $V_q^*$ is determined by a q-axis voltage controller 120 according to torque component command currents $i_q^*$ and $i_q$ of the motor 10. In this case, the currents $i_d$ and $i_q$ of the motor can be calculated from currents $i_\alpha$ and $i_\beta$ in the stationary coordinate system which are calculated from a 3-phase voltage and a 3-phase current actually applied from the inverter 20 to the motor 10. Likewise, the currents $i_\alpha$ and $i_\beta$ of the motor 10 in the stationary coordinate system are converted into the currents $i_d$ and $i_q$ of the rotating coordinate system by a coordinate converter 130.

The q-axis command current $i_q^*$, based on which the q-axis command voltage $V_q^*$ is calculated, is calculated by a q-axis current controller 140 based on the command velocity $\omega^*$ that the motor should follow and the estimated speed $\tilde{\omega}$ of the motor. The actual speed $\omega$ of the motor 10 can be obtained by using a hall sensor or using known techniques. When the actual speed $\omega$ is obtained, the q-axis current controller 140 makes the actual speed $\omega$ of the motor follow the command velocity $\omega^*$. In the present exemplary embodiment, a sensorless motor is taken as an example of the motor 10. Thus, the velocity of the motor 10 is estimated by a magnetic flux estimating unit 150 and a velocity estimating unit 160.

The magnetic flux estimating unit 150 estimates motor magnetic fluxes $(\tilde{\lambda}_d, \tilde{\lambda}_q)$ in the rotating coordinate system from the currents $i_\alpha$, and $i_\beta$ and voltages $V_\alpha$ and $V_\beta$ in the stationary coordinate system calculated based on the 3-phase voltage actually applied from the inverter 20 to the motor 10 and the currents $i_d$ and $i_q$ in the rotating coordinate system outputted from a coordinate converter 130. The velocity estimating unit 160 calculates the speed $\tilde{\omega}$ of the motor 10, namely, the estimated speed, based on the magnetic fluxes ($\tilde{\lambda}_d, \tilde{\lambda}_q$), namely, the estimated magnetic fluxes, and outputs the estimated speed of the motor to the q-axis current controller 140.

Meanwhile, in the synchronous reluctance motor, generally, the q-axis command current $i_q^*$ and the q-axis command voltage $V_q^*$ are closely related to the torque of the motor. Thus, when they reach a field weakening region where a driving voltage of the motor is not sufficient, the voltage for maintaining the torque of the motor cannot be increased further, so the q-axis command current $i_q^*$ and the q-axis command voltage $V_q^*$ are increased, instead of reducing the d-axis command voltage $V_d^*$. This is because, as noted in equation (1) shown below, the driving voltage Vs of the motor has a uniform value, so in order to increase the q-axis command voltage $V_q^*$, the d-axis command voltage $V_d^*$ should be necessarily reduced or decreased. This is called a field weakening control. Namely, it means controlling to maintain static torque in the situation where the motor driving voltage is not sufficient.

$$Vs = \sqrt{V_d^2 + V_q^2} \quad \text{[Equation 1]}$$

According to an embodiment of the present invention, the d-axis command voltage $V_d^*$ is calculated by a d-axis voltage controller 170 based on the command magnetic flux $\lambda_d^*$ of the motor 10, the d-axis estimated magnetic flux $\tilde{\lambda}_d$ of the motor 10 and the d-axis current id. It is noted from equation (1) that when the d-axis command voltage $V_d^*$ calculated by the d-axis voltage controller 170 decreases, the q-axis command voltage $V_q^*$ increases.

Figure 2:
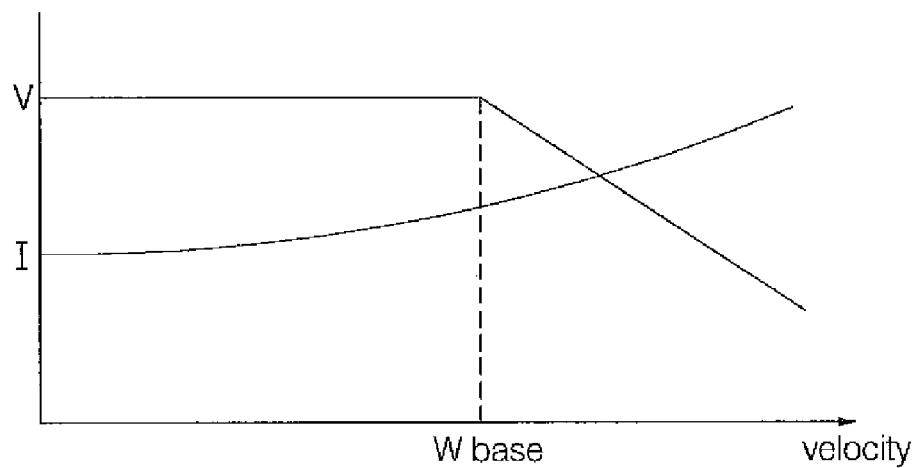
FIG. 2 is an example of a graph of voltage and current curves according to a motor speed according to the present invention.

FIG. 2 is a graph illustrating a relationship between the driving voltage and the current when the speed of the synchronous reluctance motor increases.

As shown, when the motor speed increases to above a reference value $W_{base}$, the driving voltage (V) of the motor decreases while the current (I) increases in order to maintain the static torque. Namely, when the motor speed is higher than the reference value $W_{base}$, the motor is in the field weakening region. At this time, the inverter driver 100 according to the present invention reduces the command magnetic flux $\lambda_d^*$ in order to uniformly maintain the torque.

Figure 3:
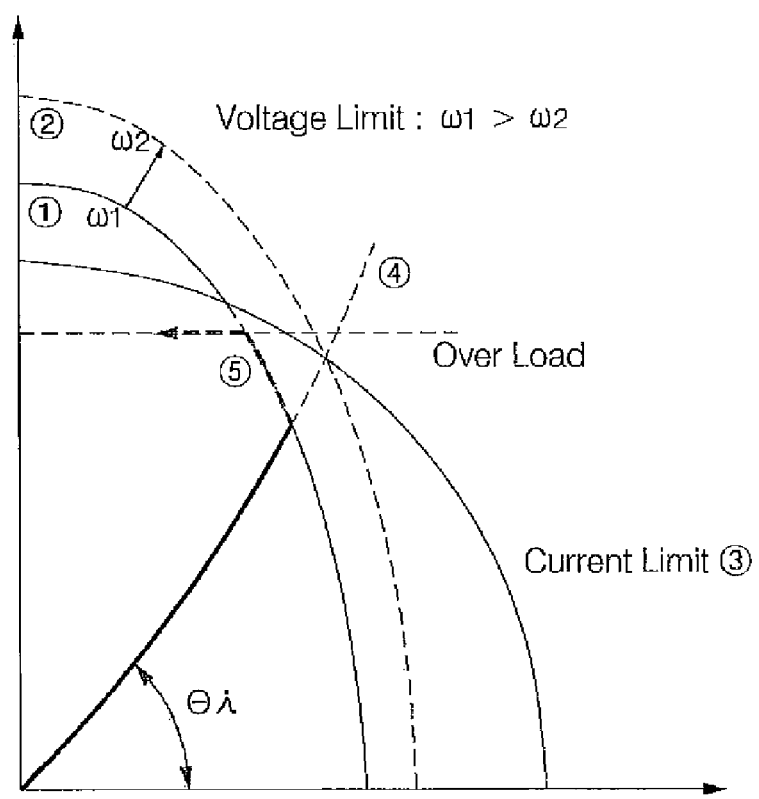
FIG. 3 is an example of a graph of voltage and current limit curves according to a motor current according to the present invention.

FIG. 3 illustrates currents $i_d$ and $i_q$ curve (③) of the motor and voltage curves (①②) of the motor according to each command velocity ($\omega 1 < \omega 2$). In this example, the horizontal and vertical axes correspond respectively to $i_d$ and $i_q$. As shown, when the command velocity of the motor decreases ($\omega 2 \rightarrow \omega 1$), the voltage of the motor increases (②→①). Namely, the extra voltage that can drive the motor increases.

There is a certain angle between the motor currents $i_d$ and $i_q$ at a positive output region (a dotted line portion ④) which has not reached yet the voltage limit when the motor is driven. This angle is called a current angle.

The current angel of the motor has the following relation expressed in equation (2) shown below:

$$\theta_i = \arctan \frac{i_q}{i_d} \quad \text{[Equation 2]}$$

When the motor speed reaches the reference voltage $W_{base}$, it reaches the voltage limit. Thus, the field weakening region (dotted line portion ⑤) that uniformly maintains the torque of the motor moves along the voltage limit curve, increasing the current angle $\theta_i$ gradually as shown in FIG. 3.

Figure 4:
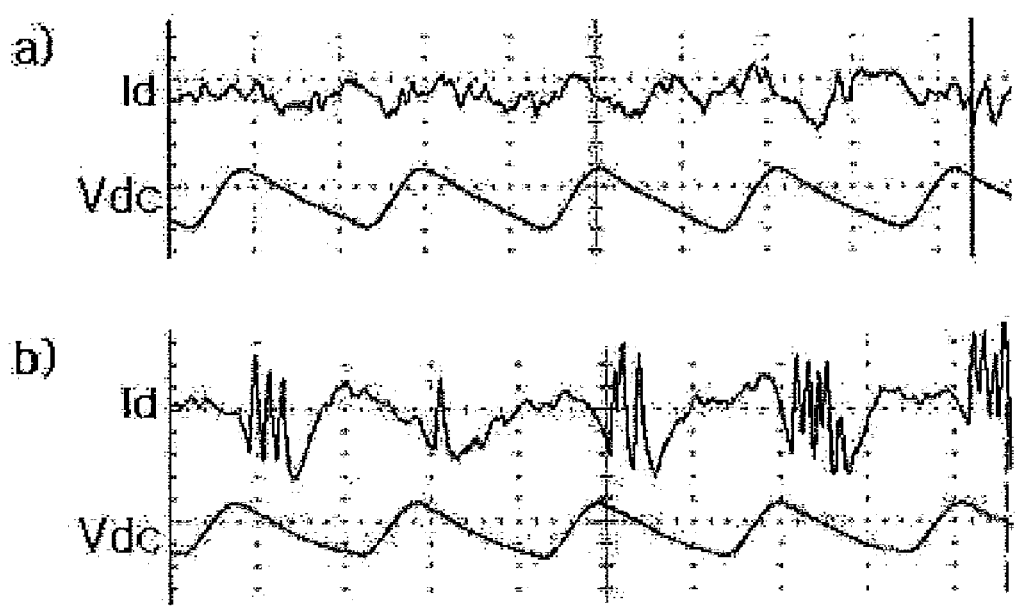
FIGS. 4a and 4b are examples of graphs of d-axis current waveforms according to a motor q-axis current according to the present invention.

However, when the current angle $\theta_i$ excessively increases, ripples are generated at the d-axis current $i_d$ of the motor as shown in FIG. 4(a). FIG. 4(a) is a graph showing an example of a waveform of the d-axis current $i_d$ when the q-axis current $i_q$ is small, and FIG. 4(b) is a graph showing an example of a waveform of the d-axis current $i_d$ when the q-axis current $i_q$ is large. As shown, in the graph of FIG. 4(a), the d-axis current $i_d$ includes ripples. According to the invention, this phenomenon occurs, as noted in equation (2), when the current angle becomes higher than an upper limit value (preferably 83° but not limited thereto, and can be controllable as necessary) as the d-axis current $i_d$ decreases to become lower than a lower limit value or the q-axis current $i_q$ increases to become higher than an upper limit value.

Figure 5:
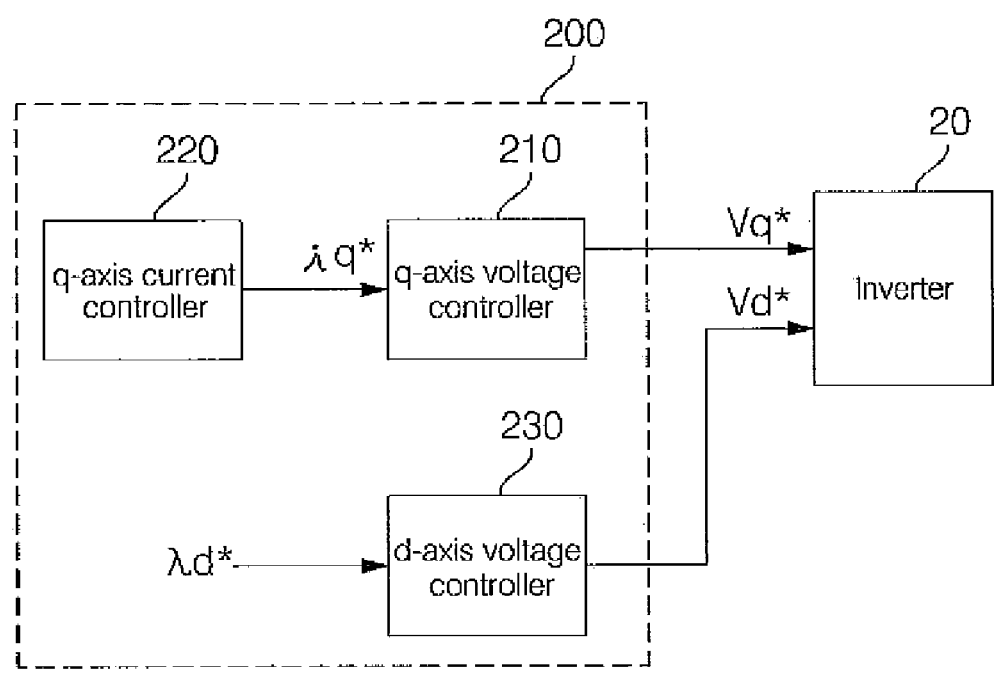
FIG. 5 is a schematic block diagram of a motor driver system according to a first exemplary embodiment of the present invention.

Thus, the present invention sets the upper limit value (e.g., 83° but not limited thereto) and prevents the current angle from exceeding the upper limit value. In the present invention, in order not to make the current angle exceed the upper limit value, as shown in FIG. 5, the d-axis command voltage $V_d^*$ is controlled not to be decreased so that it does not become lower than the lower limit value in the field weakening region. As mentioned above, the d-axis command voltage $V_d^*$ is affected by the d-axis command magnetic flux $\lambda_d^*$.

Thus, the inverter driver 200 prevents the command magnetic flux $\lambda_d^*$ from decreasing excessively to trigger the increase of the d-axis command voltage $V_d^*$ to thus increase the current angle to above the upper limit value.

The inverter driver 200 includes a q-axis voltage controller 210 that outputs the q-axis command voltage to the inverter 20, a q-axis current controller 220 that outputs the q-axis command current according to the command velocity input thereto, and a d-axis voltage controller 230 that outputs the d-axis command voltage $V_d^*$ according to the command magnetic flux $\lambda_d^*$.

Figure 6:
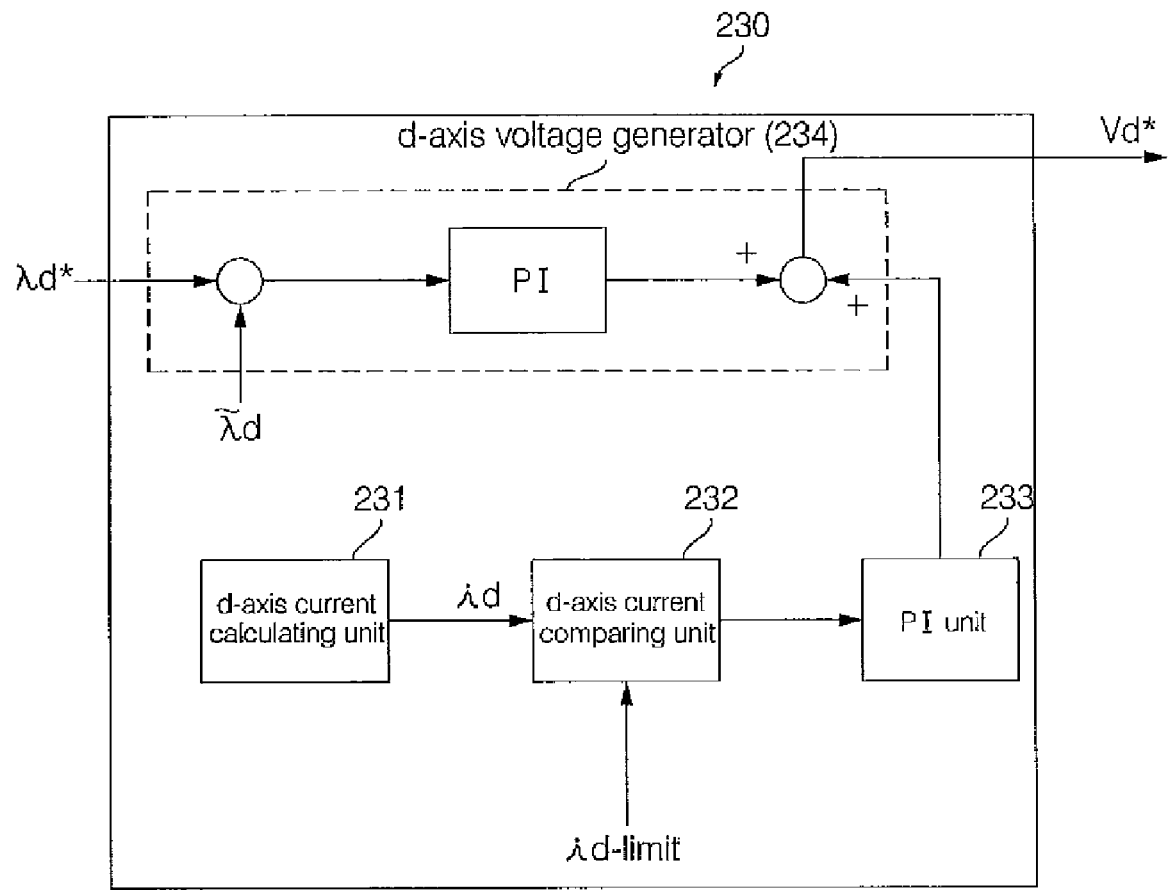
FIG. 6 is a schematic block diagram showing the construction of a d-axis voltage controller in FIG. 5 according to an embodiment of the present invention.

The detailed construction of the d-axis voltage controller 230 will be described as follows with reference to FIG. 6 according to an embodiment of the present invention.

In the present invention, the d-axis voltage controller 230 includes a d-axis current calculating unit 231 that periodically calculates the d-axis current $i_d$ of the motor 10, a d-axis current comparing unit 232 that compares the calculated d-axis current $i_d$ and a pre-set lower limit value $i_{d\_limit}$, an PI unit 233 that integrates a difference value between the calculated d-axis current $i_d$ and the pre-set lower limit value $i_{d\_limit}$ when the calculated d-axis current $i_d$ is lower than the pre-set lower limit value $i_{d\_limit}$, and a d-axis voltage generator 234 that generates the d-axis command voltage $V_d^*$ by adding the difference value integrated measure of the PI unit 233 to a difference value integrated measure between the command magnetic flux $\lambda_d^*$ and the motor magnetic flux $\tilde{\lambda}_d$. For instance, the integrated value of the difference between the calculated d-axis current $i_d$ and the pre-set lower limit value $i_{d\_limit}$ as output from the PI unit 233 is added to the integrated value of the difference between the command magnetic flux $\lambda_d^*$ and the motor magnetic flux $\tilde{\lambda}_d$ as output from the PI unit of the d-axis voltage generator 234. As a result, the d-axis voltage controller 230 varies the input command magnetic flux $\lambda_d^*$ using the d-axis current so as to output a d-axis command voltage Vd* that is varied accordingly.

In other words, according to the first exemplary embodiment of the present invention, when the d-axis current $i_d$ of the motor is lower than the lower limit value $i_{d\_limit}$, the d-axis voltage controller 230 varies the command magnetic flux $\lambda_d^*$ according to (or using) the d-axis current $i_d$ to generate the d-axis command voltage $V_d^*$ and outputs the same to the inverter. In this case, the lower limit value $i_{d\_limit}$ of the d-axis current is preferably an existing value previously set based on a maximum current angle that the motor current may have. The maximum current angle can be set for the motor through experimentation, or can be changed according to a motor driving environment.

Meanwhile, when the command d-axis voltage Vd* is varied to a particular value by the d-axis voltage controller 230, the d-axis command current $i_d^*$ of the motor is also varied Accordingly, the q-axis command current $i_q^*$ is also varied. In this case, the q-axis command current $i_q^*$ also has an upper limit value because, as inferred from equation (1), if the q-axis command current $i_q^*$ excessively increases, the motor q-axis current $i_q$ increases, and the current angle increases accordingly.

Figure 7:
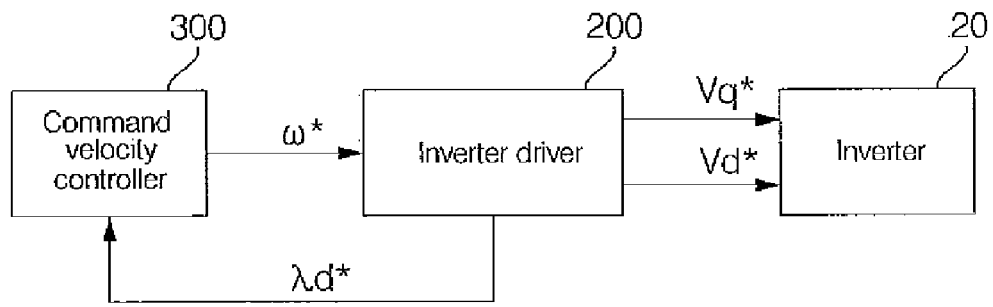
FIG. 7 is a schematic block diagram showing an addition of a command velocity controller to the first exemplary embodiment of the present invention.

Thus, as shown in FIG. 7, a command velocity controller 300 may be additionally provided along with the inverter driver 200 to control the command velocity $\omega^*$ according to the varied command magnetic flux $\lambda_d^*$. Namely, when the command magnetic flux $\lambda_d^*$ has been varied by the d-axis voltage controller 230, if there is a possibility that the current angle increases to above the set upper limit value, the command velocity controller 300 lowers the command velocity $\omega^*$ to stabilize the motor control.

Figure 8:
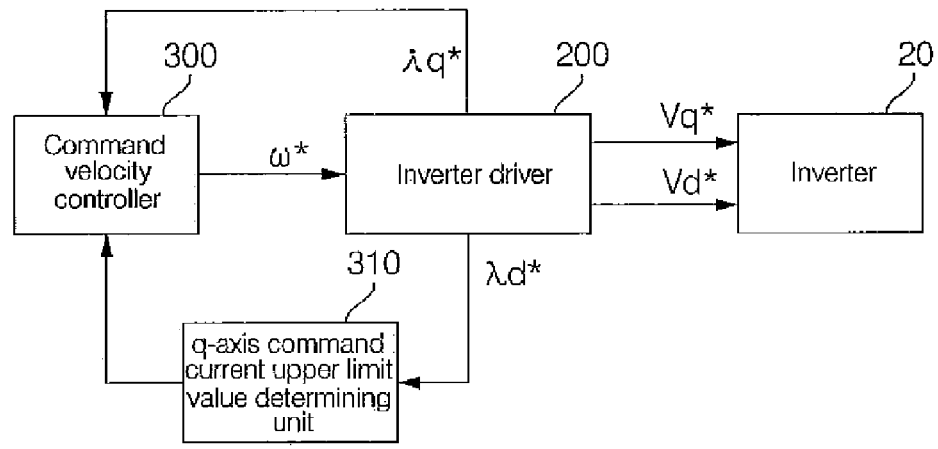
FIG. 8 is a schematic block diagram showing an addition of a q-axis command current upper limit value determining unit to the first exemplary embodiment of the present invention.

The upper limit value of the q-axis command current $i_q^*$ is determined according to the current angle of the motor current. Thus, in the first exemplary embodiment of the present invention, as shown in FIG. 8, a q-axis command current upper limit value determining unit 310 may further be provided to determine an upper limit value of the q-axis command current $i_q^*$.

The q-axis command current upper limit value determining unit 310 determines the q-axis command current upper limit value based on the d-axis command current $i_d^*$ and the current angle according to the varied command magnetic flux $\lambda_d^*$. In this case, as stated above, the current angle can be varied according to the motor driving environment or according to a range of the current ripples the motor may endure. The current angle can be obtained through experimentation.

The motor may entirely consume the voltage in the field weakening region, so an extra voltage measure should be secured for current sensing. In the present invention, magnetic flux has a proportional relationship with voltage, so a minimum voltage margin value $\Delta V_{min}$ available for current sensing, etc., is previously determined and the d-axis command magnetic flux value $\lambda_d^*$ related to voltage is cooperatively varied so that a voltage margin $\Delta V$ may not become lower than a minimum voltage margin $\Delta V_{min}$. The voltage margin $\Delta V$ is a value obtained by subtracting an actually provided voltage from the voltage that can be outputted from the inverter.

When the command magnetic flux value $\lambda_d^*$ is reduced because there is not much extra voltage margin $\Delta V$, it may be reduced to below a magnetic flux limit value $\lambda_{d\_limit}$. In this case, in the present invention, in addition to setting a magnetic flux lower limit value (which is as good as setting the d-axis current lower limit value), the command velocity $\omega^*$ is also controlled to be lowered to maintain the stability of controlling.

Figure 9:
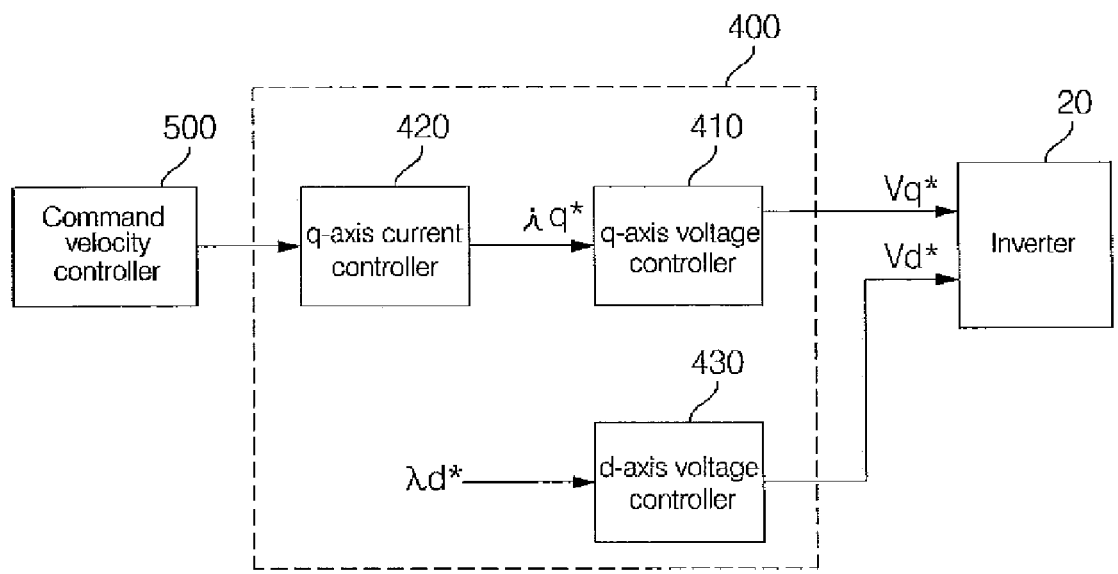
FIG. 9 is a schematic block diagram of a motor driver system according to a second exemplary embodiment of the present invention.

FIG. 9 is a schematic block diagram of a motor driver system according to a second exemplary embodiment of the present invention. As shown, the motor driver system according to the second exemplary embodiment of the present invention includes an inverter 20 and an inverter driver 400 that outputs command voltages Vd* and Vq* to the inverter 20. The inverter driver 400 includes a q-axis voltage controller 410 that outputs a q-axis command voltage to the inverter 20, and a q-axis current controller 420 that outputs a q-axis command current to the q-axis voltage controller 410. The components 410, 420 and 430 of the inverter driver 400 operates in the same or similar manner as the respective components 210, 220 and 230 of the inverter driver 200.

In the second exemplary embodiment, the inverter driver 400 also includes a d-axis voltage controller 430 that outputs a d-axis command voltage to the inverter 20. The motor driver system according to the second exemplary embodiment of the present invention further includes a command velocity controller 500 that performs field weakening control according to the general method, by controlling (increasing or decreasing) the command velocity when the command velocity needs to be increased above the upper limit value while a command magnetic flux is being varied.

For instance, likewise as in the first exemplary embodiment, the d-axis voltage controller 430 calculates the d-axis current of the motor and varies the command magnetic flux accordingly, and in addition to this, the command velocity controller 500 increases the command velocity $\omega^*$ regardless of a requested torque when the q-axis command current $i_q^*$ exceeds the upper limit value or when the command magnetic flux $\lambda_d^*$ is lower than the lower limit value in the general field weakening control, in order to secure an extra voltage in driving the motor.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

As described above, the motor drive system and its control method according to the present invention have various advantages. For instance, the present invention sets an upper limit value for the current angle and controls the command magnetic flux and/or the d-axis command voltage so that the current angle does not exceed the upper limit value. Further, even when the command magnetic flux decreases as the motor operates in the field weakening region, the current angle can be maintained always at below the limit value, and thus, the stability of the motor control can be accomplished.

What is claimed is:

1. A motor driver system comprising:
   an inverter that applies a motor driving 3-phase voltage to a motor; and
   an inverter driver that generates and outputs a command voltage to the inverter to make the speed of the motor follow a command velocity,
   wherein when the motor operates in a field weakening region, the inverter driver controls a magnetic flux command value to prevent a command current angle of a d-axis or q-axis command current from exceeding a pre-set value,
   wherein the inverter driver comprises:
   a d-axis voltage controller that generates a d-axis command voltage by varying a magnetic flux command value according to a d-axis current value and outputs the generated d-axis command value to the inverter, when a d-axis current value of the motor is lower than a pre-set lower limit value, and
   wherein the d-axis voltage controller comprises:
   a d-axis current calculating unit that periodically calculates the d-axis current value of the motor;
   a d-axis current comparing unit that compares the calculated d-axis current value and the pre-set lower limit value;
   a PI unit that integrates a difference value between the calculated d-axis current value and the pre-set lower limit value when the calculated d-axis current value is lower than the pre-set lower limit value; and
   a d-axis voltage generator that generates a d-axis command voltage by adding the integrated value output from the PI unit to an integrated value of a difference value between the magnetic flux command value and an integrated magnetic flux of the motor.

2. The system of claim 1, wherein the inverter driver further comprises:
   a q-axis current controller that outputs a q-axis command current value to make the speed of the motor to follow the command velocity; and
   a q-axis voltage controller that outputs the q-axis command voltage to the inverter according to the q-axis command current value.

3. The system of claim 1, wherein after the inverter driver reduces the magnetic flux command value, when an extra voltage for driving the motor increases to above a pre-set value, the inverter driver increases the magnetic flux command value.

4. The system of claim 3, further comprising:
   a command velocity controller that reduces the command velocity of the motor when the magnetic flux command value becomes lower than a pre-set magnetic flux command value.

5. A motor driver system comprising:
   an inverter that applies a motor driving 3-phase voltage to a motor;
   an inverter driver that generates and outputs a command voltage to the inverter to make the speed of the motor follow a command velocity;
   a command velocity controller that reduces the command velocity of the motor when a q-axis command current value of the motor is higher than a set upper limit value; and
   a q-axis command current upper limit value determining unit that determines the upper limit value of the q-axis command current value based on a d-axis command current value of the motor according to a maximum current angle allowed within the magnetic flux command value, wherein when the motor operates in a field weakening region, the inverter driver controls a magnetic flux command value to prevent a command current angle of a d-axis or q-axis command current from exceeding a pre-set value, and wherein the inverter driver comprises:
a d-axis voltage controller that generates a d-axis command voltage by varying the magnetic flux command value according to a d-axis current value and outputs the generated d-axis command value to the inverter, when a d-axis current value of the motor is lower than a pre-set lower limit value.

6. A motor driver system comprising:
an inverter that applies a motor driving 3-phase voltage to a motor;
an inverter driver that generates and outputs a command voltage to the inverter to make the speed of the motor follow a command velocity, and reduces a magnetic flux command value of the motor when the motor operates in a field weakening region;
a command velocity controller that reduces the command velocity when a q-axis command current value generated according to the command velocity is higher than a pre-set upper limit value; and
a q-axis command current upper limit value determining unit that determines the upper limit value for the q-axis command current value based on a d-axis command current value according to a maximum current angle allowed within the magnetic flux command value of the motor.

7. A method for controlling a motor driver system, comprising:
generating a q-axis command voltage to make the speed of a motor follow a command velocity;
controlling a magnetic flux command value of the motor so as to prevent a command current angle of a d-axis or q-axis command current from exceeding a pre-set value when the motor operates in a field weakening range; and
generating a d-axis command voltage according to the controlled magnetic flux command value,
wherein, in controlling the magnetic flux command value, if the d-axis command current value of the motor is lower than a pre-set lower limit value, the magnetic flux command value is varied according to the d-axis current value, and
wherein the controlling of the magnetic flux command value comprises:
periodically calculating the d-axis current value of the motor;
integrating a difference value between the calculated d-axis current value and the pre-set lower limit value, when the calculated d-axis current value is lower than the pre-set lower limit value; and
adding the integrated value to an integrated value of a difference value between the magnetic flux command value and an estimated magnetic flux of the motor.

8. The method of claim 7, further comprising:
reducing the command velocity of the motor when a q-axis command current value for generating the q-axis command voltage is higher than a pre-set upper limit value.

9. The method of claim 7, wherein, in controlling the magnetic flux command value, when an extra voltage for diving the motor increases by more than a pre-set value after the magnetic flux command value is reduced, the magnetic flux command value is controlled to be increased.

10. The method of claim 9, wherein when the magnetic flux command value becomes lower than a pre-set magnetic flux command value, the command velocity of the motor is controlled to be reduced.

11. A method for controlling a motor driver system, comprising:
generating a q-axis command voltage to make the speed of a motor follow a command velocity:
controlling a magnetic flux command value of the motor so as to prevent a command current angle of a d-axis or q-axis command current from exceeding a pre-set value when the motor operates in a field weakening range;
generating a d-axis command voltage according to the controlled magnetic flux command value; and
reducing the command velocity of the motor when a q-axis command current value for generating the q-axis command voltage is higher than a pre-set upper limit value,
wherein the upper limit value of the q-axis command current value is determined based on the d-axis command current value according to a maximum current angle allowed within the magnetic flux command value.

12. A method for controlling a motor driver system, comprising:
generating a q-axis command voltage to make the speed of a motor follow a command velocity;
reducing a magnetic flux command value of the motor when the motor operates in a field weakening region; and
reducing the command velocity when a q-axis command current value generated according to the command velocity is higher than a pre-set upper limit value or the magnetic flux command value becomes lower than a pre-set lower limit value,
wherein the upper limit value of the q-axis command current value is determined based on the d-axis command current value according to a maximum current angle allowed within the magnetic flux command value of the motor.

* * * * *